United States Patent
Pisklak et al.

(10) Patent No.: US 10,781,355 B2
(45) Date of Patent: Sep. 22, 2020

(54) TUNABLE CONTROL OF POZZOLAN-LIME CEMENT COMPOSITIONS

(71) Applicant: Halliburton Energy Services, Inc., Houston, TX (US)

(72) Inventors: Thomas Jason Pisklak, Cypress, TX (US); Kyriacos Agapiou, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 159 days.

(21) Appl. No.: 16/033,907

(22) Filed: Jul. 12, 2018

(65) Prior Publication Data

US 2019/0136115 A1 May 9, 2019

Related U.S. Application Data

(62) Division of application No. 15/113,168, filed as application No. PCT/US2014/019546 on Feb. 28, 2014, now Pat. No. 10,047,270.

(51) Int. Cl.
*C09K 8/467* (2006.01)
*C04B 14/16* (2006.01)
(Continued)

(52) U.S. Cl.
CPC .............. *C09K 8/46* (2013.01); *C04B 22/124* (2013.01); *C04B 22/147* (2013.01); *C04B 22/16* (2013.01);
(Continued)

(58) Field of Classification Search
CPC ......... C04B 7/12; C04B 14/062; C04B 14/16; C04B 14/10; C04B 18/08; C04B 7/26; C09K 8/467; C09K 8/42; E21B 33/13
See application file for complete search history.

(56) References Cited

U.S. PATENT DOCUMENTS 5,302,200 A  4/1994 Smetana et al.
5,671,581 A  9/1997 Nagahama
(Continued)

FOREIGN PATENT DOCUMENTS

CA  1133021  10/1982
JP  2007-161507  6/2007
(Continued)

OTHER PUBLICATIONS

Canadian Examination Report for Application No. 2,933,007 published Dec. 22, 2017.
(Continued)

*Primary Examiner* — Catherine Loikith
(74) *Attorney, Agent, or Firm* — Thomas Rooney; C. Tumey Law Group PLLC

(57) ABSTRACT

A variety of cement compositions and methods of using cement compositions in subterranean formations. A method of formulating a cement composition may comprise: surface area of a group of pozzolans, wherein the smallest measured surface area of the group of pozzolans and the largest measured surface area of the group of pozzolans vary by about 50% or greater. The method may further comprise selecting one or more pozzolans from the group of pozzolans. The method may further comprise adding components comprising lime and water to the selected one or more pozzolans to form a cement composition.

11 Claims, 2 Drawing Sheets

(51) Int. Cl.

| | | |
|---|---|---|
| C04B 14/10 | (2006.01) | |
| C04B 18/08 | (2006.01) | |
| C04B 7/12 | (2006.01) | |
| C04B 7/26 | (2006.01) | |
| C09K 8/42 | (2006.01) | |
| E21B 33/13 | (2006.01) | |
| C09K 8/46 | (2006.01) | |
| C04B 28/18 | (2006.01) | |
| C04B 40/06 | (2006.01) | |
| C04B 22/12 | (2006.01) | |
| C04B 22/14 | (2006.01) | |
| C04B 22/16 | (2006.01) | |
| C04B 24/20 | (2006.01) | |
| C04B 24/32 | (2006.01) | |
| E21B 33/138 | (2006.01) | |
| E21B 33/14 | (2006.01) | |
| C04B 103/10 | (2006.01) | |
| C04B 103/20 | (2006.01) | |
| C04B 103/12 | (2006.01) | |
| C04B 103/22 | (2006.01) | |
| C04B 103/40 | (2006.01) | |

(52) U.S. Cl.
CPC .............. *C04B 24/20* (2013.01); *C04B 24/32* (2013.01); *C04B 28/18* (2013.01); *C04B 28/188* (2013.01); *C04B 40/0658* (2013.01); *C09K 8/467* (2013.01); *E21B 33/138* (2013.01); *E21B 33/14* (2013.01); *C04B 2103/10* (2013.01); *C04B 2103/12* (2013.01); *C04B 2103/20* (2013.01); *C04B 2103/22* (2013.01); *C04B 2103/408* (2013.01); *Y02W 30/92* (2015.05); *Y02W 30/94* (2015.05)

(56) References Cited

U.S. PATENT DOCUMENTS

| | | | |
|---|---|---|---|
| 6,176,607 B1 | 1/2001 | Hajianpour | |
| 7,631,692 B2 | 12/2009 | Roddy et al. | |
| 8,557,036 B1 | 10/2013 | Chatterji et al. | |
| 8,899,329 B2 | 12/2014 | Chatterji et al. | |
| 2007/0235192 A1 | 10/2007 | Michaux et al. | |
| 2010/0044043 A1 | 2/2010 | Roddy et al. | |
| 2011/0118155 A1 | 5/2011 | Pisklak et al. | |
| 2011/0259246 A1 | 10/2011 | Guynn et al. | |
| 2012/0012034 A1 | 1/2012 | Guynn et al. | |
| 2012/0247766 A1 | 10/2012 | Hemmings | |
| 2013/0153222 A1 | 6/2013 | Pisklak et al. | |
| 2013/0233550 A1 | 9/2013 | Brothers et al. | |
| 2013/0248183 A1 | 9/2013 | Pisklak et al. | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0083701 A1 | 3/2014 | Boul et al. | |
| 2014/0090843 A1 | 4/2014 | Boul et al. | |
| 2014/0174741 A1 | 6/2014 | Agapiou et al. | |
| 2014/0190696 A1 | 7/2014 | Iverson et al. | |
| 2014/0202698 A1 | 7/2014 | Pisklak et al. | |
| 2014/0216746 A1 | 8/2014 | Ballew et al. | |
| 2014/0373756 A1 | 12/2014 | Brothers et al. | |
| 2015/0175481 A1 | 6/2015 | Pisklak et al. | |
| 2015/0175869 A1 | 6/2015 | Agapiou et al. | |
| 2015/0197033 A1 | 7/2015 | Agapiou et al. | |
| 2015/0197453 A1 | 7/2015 | Pisklak et al. | |
| 2015/0315875 A1 | 11/2015 | Chatterji et al. | |
| 2015/0322327 A1 | 11/2015 | Chatterji et al. | |
| 2016/0075933 A1 | 3/2016 | Pisklak et al. | |
| 2016/0084037 A1 | 3/2016 | Brothers et al. | |
| 2016/0137902 A1 | 5/2016 | Pisklak et al. | |
| 2016/0186036 A1 | 6/2016 | Pisklak et al. | |
| 2016/0194545 A1 | 7/2016 | Pisklak et al. | |
| 2017/0374098 A1 | 12/2017 | Kish et al. | |

FOREIGN PATENT DOCUMENTS

| | | |
|---|---|---|
| JP | 2007-247381 | 9/2007 |
| JP | 2008-156229 | 7/2008 |
| JP | 2009-084095 | 4/2009 |
| JP | 2010155642 | 7/2010 |
| WO | 2011103371 | 8/2011 |

OTHER PUBLICATIONS

Hiroyuki Ohga, "Effective utilization of resources and concrete (seventh): concrete using fly ash or limestone," Concrete Technology 34(6), Jun. 1996, 69-74.

Kouhei Eguchi, "Basic study for quality improvement of concrete by using artificial pozzolana comprising metakaolin," an academic dissertation (Kagoshima University, Doctor of Engineering, degree conferment No. 368, dated Mar. 25, 2014).

JP Examination Report dated Jan. 15, 2017.

Partially translated Japanese Office Action for Application No. 2016-542223 dated Jul. 19, 2017.

Australian Examination Report No. 2 for Application No. 2014384713 dated Aug. 14, 2017.

International Search Report and Written Opinion for Application No. PCT/US2014/019546 dated Nov. 18, 2014.

Effect of Blended Fly Ash on the Compressive Strength of Cement Pastes. Concrete Research Letters, 2012, vol. 2, No. 4, pp. 336-345, Agarwal, S.K. et al.

Effect of Fly Ash on Compressive Strength and Power Size of blended cement paste. Cement and Concrete Composites, 2005, vol. 27, No. 4, Chindaprasirt, Prinya et al.

High Replacements of Reactive Pozzolan in Blended Cements: Microstructure and Mechanical Properties, Cement and Concrete Composites, 2010, vol. 32, No. 5, Mostafa, Nasser Y. et al.

Non-Final Office Action for U.S. Appl. No. 15/113,168 dated Oct. 31, 2017.

US 10,781,355 B2

TUNABLE CONTROL OF POZZOLAN-LIME CEMENT COMPOSITIONS

BACKGROUND

The present embodiments relate to cement compositions and, in particular embodiments, to controlling the properties of cement compositions comprising a pozzolan and lime.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby fainting an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string prevents the migration of fluids in the annulus and protects the pipe string from corrosion. Cement compositions may also be used in remedial cementing methods to seal cracks or holes in pipe strings or cement sheaths, to seal highly permeable formation zones or fractures, or to place a cement plug and the like.

A broad variety of cement compositions have been used in subterranean cementing operations. In some instances, set-delayed cement compositions have been used. Set-delayed cement compositions are characterized by being capable of remaining in a pumpable fluid state for at least about one day (e.g., about 7 days, about 2 weeks, about 2 years or more) at room temperature (e.g., about 80° F.) in quiescent storage. When desired for use, the set-delayed cement compositions should be capable of activation and consequently develop reasonable compressive strengths. For example, a cement set activator may be added to a set-delayed cement composition to induce the composition to set into a hardened mass. Among other things, set-delayed cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While cement compositions and set-delayed cement compositions have been developed heretofore, problems may exist when formulating these compositions for specific applications. For example, a composition with low reactivity may be desired such that the composition may maintain a low viscosity for applications requiring the cement composition to remain in a pumpable fluid state for a long period. However, such low reactivity fluids may not possess sufficient compressive strength when set to actually be suitable compositions for their intended use. Typically, cement compositions may use additives to enhance cement properties (e.g., compressive strength). However, additives may create additional costs as well as compatibility issues with other fluids or with the formation itself. Therefore, it may be desirable to adjust the properties of a cement composition while limiting the need to adjust the compositional makeup of the cement composition.

BRIEF DESCRIPTION OF THE DRAWINGS

These drawings illustrate certain aspects of some of the embodiments of the present methods and compositions, and should not be used to limit or define the methods or compositions.

DETAILED DESCRIPTION

Figure 1:
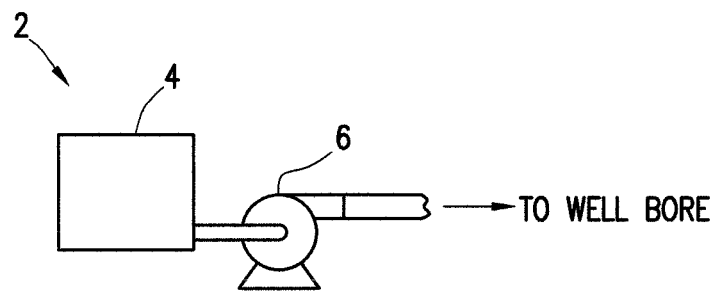
FIG. 1 illustrates a system for preparation and delivery of a cement composition to a wellbore in accordance with certain embodiments.

The present embodiments relate to cement compositions and, in particular embodiments, to controlling the properties of cement compositions comprising a pozzolan and lime. For example, properties of the cement composition may be tuned for a specific application. Embodiments may comprise selection of a pozzolan based on surface area and/or particle size and further optional embodiments may comprise the blending of two or more pozzolans to control the properties of a cement composition.

Embodiments of the cement compositions may generally comprise water, a pozzolan, and lime. Optionally, the cement compositions may further comprise a dispersant and/or a retarder. Embodiments of the cement compositions comprising a retarder may be set-delayed such that they are capable of remaining in a pumpable fluid state for an extended period of time. For example, the set-delayed cement compositions may remain in a pumpable fluid state for at least about 1 day or longer. The cement compositions may be suitable for a number of cementing operations; they may be particularly suitable for use in subterranean formations having relatively low bottom hole static temperatures, e.g., temperatures of about 200° F. or less or ranging from about 100° F. to about 200° F. In alternative embodiments, the cement compositions may be used in subterranean formations having bottom hole static temperatures up to 450° F. or higher.

The water used in embodiments may be from any source provided that it does not contain an excess of compounds that may undesirably affect other components in the cement compositions. For example, a cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the cement compositions in an amount in the range of from about 33% to about 200% by weight of the pozzolan. In certain embodiments, the water may be present in the cement compositions in an amount in the range of from about 35% to about 70% by weight of the pozzolan. With the benefit of this disclosure one of ordinary skill in the art will recognize the appropriate amount of water for a chosen application.

Embodiments of the cement compositions may comprise a pozzolan. A variety of different pozzolans may be suitable for use in embodiments. Example embodiments comprising a pozzolan may comprise fly ash, silica fume, metakaolin, a natural pozzolan (e.g., pumice), or combinations thereof. In some embodiments, the cementitious components present in the cement composition may consist essentially of the pozzolan. For example, the cementitious components may primarily comprise the pozzolan without any additional cementitious components (e.g., Portland cement) that hydraulically set in the presence of water.

An example of a suitable pozzolan may comprise fly ash. A variety of fly ash may be suitable for particular embodiments, including fly ash classified as Class C and Class F fly ash according to the American Petroleum Institute, *API Specification for Materials and Testing for Well Cements*, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions is necessary for a cement composition comprising Class F fly ash. In some embodiments, lime may be mixed with Class F fly ash in an amount in the range of about 0.1% to about 100% by weight of the fly ash. In some instances, the lime may be hydrated lime. Suitable examples of fly ash include, but are not limited to, POZ-MIX® A cement additive, commercially available from Halliburton Energy Services, Inc., Houston, Tex.

An example of a suitable pozzolan may comprise metakaolin. Generally, metakaolin is a white pozzolan that may be prepared by heating kaolin clay to temperatures in the range of about 600° to about 800° C.

An example of a suitable pozzolan may comprise a natural pozzolan. Natural pozzolans are generally present on the Earth's surface and set and harden in the presence of hydrated lime and water. For example, pumice is a natural pozzolan. Pumice is a volcanic rock that may exhibit cementitious properties. An example of a suitable pumice is available from Hess Pumice Products, Inc., Malad, Id., as DS-325 lightweight aggregate. Pumice Example embodiments comprising a natural pozzolan may comprise pumice, diatomaceous earth, volcanic ash, opaline shale, tuff, and combinations thereof. The natural pozzolans may be ground or unground.

Generally, the pozzolan may have any particle size distribution as desired for a particular application. As used herein, "particle size" refers to volume surface mean diameter ("$D_S$") which is related to the specific surface area. Volume surface mean diameter may be defined by the following formula: $D_S=6/(\Phi_S A_w \rho_p)$ where $\Phi_S$=sphericity; $A_w$=Specific surface area and $\rho_p$=Particle density. It should be understood that the particle size may vary based on the measurement technique, sample preparation, and sample conditions (e.g., temperature, concentration, etc.). In certain embodiments, the pozzolan may have a d50 particle size distribution in a range of from about 1 micron to about 200 microns. The d50 values may be measured by particle size analyzers such as those manufactured by Malvern Instruments, Worcestershire, United Kingdom. In specific embodiments, the pozzolan may have a d50 particle size distribution in a range of from about 1 micron to about 200 microns, from about 5 microns to about 100 microns, or from about 10 microns to about 25 microns. In a particular embodiment, the pozzolan may have a d50 particle size distribution of about 15 microns or less. An example of a suitable pozzolan is available from Hess Pumice Products, Inc., Malad, Id., which is a DS-325 lightweight aggregate pumice, having a d50 particle size distribution of about 12-17 microns.

Generally, the pozzolan may have any size surface area as desired for a particular application. As used herein, "surface area" is defined as the total area of the particle's faces and curved surfaces. The specific surface area may be calculated by the Brunauer-Emmett-Teller methodology of measuring the gas adsorption on a particle surface. In certain embodiments, the pozzolan may have a surface area in a range of from about 1 $m^2/g$ to about 500 $m^2/g$ or even greater. The surface area values may be measured by a Quantachrome NOVA® 2200e surface area analyzer such as those manufactured by Quantachrome Instruments, Boynton Beach, Fla. In specific embodiments, the pozzolan may have a surface area in a range of from about 1 $m^2/g$ to about 20 $m^2/g$, from about from about 5 $m^2/g$ to about 20 $m^2/g$, or from about 10 $m^2/g$ to about 15 $m^2/g$. In a particular embodiment, the pozzolan may have a surface area of about 20 $m^2/g$ or less. An example of a suitable pozzolan is available from Hess Pumice Products, Inc., Malad, Id., which is a DS-325 lightweight aggregate pumice, having a surface area distribution of about 20 $m^2/g$ or less.

It should be appreciated that particle sizes too small may have mixability problems while particle sizes too large may not be effectively suspended in the cement compositions. Similarly, surface areas too large may be too reactive and prematurely gel or set, while surface areas too small may be too unreactive and not set quick enough or provide enough compressive strength. Therefore, embodiments comprise selecting a pozzolan based on the dimensions of particle size and surface area such that the shelf life, rheology, and compressive strength may be tuned to provide a cement composition with the specific properties desired for a particular application.

In embodiments, the pozzolan may comprise two or more pozzolans with different surface areas and/or different particle sizes. For example, the pozzolans may comprise pozzolans with particles sizes varying by as much as 50% or more, such that the pozzolan particles of the two or more pozzolans may have particles sizes that vary by about 10%, about 20%, about 30%, about 40%, about 50%, or more. As another example, the pozzolans may comprise particles with surface areas varying by as much as 50% or more, such that the pozzolan particles of the two or more pozzolans may have surface areas that vary by about 10%, about 20%, about 30%, about 40%, about 50%, or more. In particular embodiments, two or more pozzolans may be used having particle sizes that vary about 10% or less, but have surface areas that vary by about 10% or more. By way of example, the surfaces areas of the two or more pozzolans may vary about 10%, about 20%, about 30% about 40%, about 50%, or more while the particles sizes vary by about 10%, about 5%, or less. The two or more pozzolans may be the same type of pozzolan (e.g., pumice), but have a surface area that varies. In embodiments, requiring particles with a specific distribution of particles sizes and/or surface areas, it may therefore be necessary to select and isolate pozzolan particles.

Embodiments of the present technique may comprise measuring the particle size and surface areas of a group of pozzolans and/or sorting the pozzolans according to those measurements. The group of pozzolans may comprise pozzolans of the same type but with different particle size and/or surface areas. The particle size and surface areas may be measured by any sufficient means, such as those techniques discussed herein. Once the particle size and surface area have been measured, the pozzolans may be sorted according to those measurements. Sorting of the pozzolans may comprise isolating and the organizing the pozzolans into groups or categories that are specific to a predetermined range of particle size and/or surface area distributions. Alternatively, the sorting may comprise filtration. In embodiments, the pozzolans may be filtered by any sufficient means such that the pozzolans are sorted via filtration into two or more groups based on particle size, surface area, or both. Isolating and sorting pozzolan particles based on particle size and/or surface area may allow for tuning of pozzolan properties such as shelf life, rheology, compressive strength, and overall reactivity. One of ordinary skill in the art, with the benefit of this disclosure, should be able to isolate and select a particle size and/or surface area for the pozzolan (or pozzolans) suitable for a chosen application.

In embodiments, the pozzolan may comprise a blend of two or more pozzolans. By way of example, one or more dry pozzolans may be blended with one or more dry pozzolans. Alternatively, one or more wet pozzolans may be blended with one or more dry pozzolans. Further, one or more wet pozzolans may be blended with one or more wet pozzolans. The blend of pozzolans may comprise a blend of two or more pozzolans of different types e.g., a blend of fly ash and pumice, and/or the blend may comprise a blend of two or more pozzolans of the same type (e.g., pumice) with particles of different surface areas and/or particle sizes, e.g., a blend of pumice comprising a surface area of 18 $m^2/g$ with a pumice comprising a surface area of 12 $m^2/g$. Blending of a pozzolan based on type and/or particle size and/or surface area may allow for the formulation of a pozzolan slurry comprising a shelf life, rheology, compressive strength, and overall reactivity suitable for a specific application. For example, a pozzolan comprising a high surface area may be blended with a sufficient amount of a pozzolan comprising a low surface area such that the overall blend has a long shelf life and maintains a low viscosity but also has a sufficient compressive strength upon setting. One of ordinary skill in the art, with the benefit of this disclosure, should be able to blend two or more pozzolans to create a cement composition suitable for a chosen application.

In embodiments, the pozzolans may be blended using any sufficient mechanism or technique. For example, the pozzolans may be blended by a batch or continuous mixer (e.g., rotary, ribbon, paddle and plow, and the like). The process of blending the pozzolans may require the mixing equipment to be controlled in such a way so as to not induce further alterations to the particle size or surface area of the pozzolans. Although the pozzolans may be blended by any such mechanism or technique sufficient to produce a blended composition, mechanisms or techniques that minimize alterations to the particle size or surface areas of the particles are preferred. The pozzolans may be blended in any ratio to achieve a specific range of properties necessary for a specific application. For example, pozzolans of varying surface areas and particle sizes may be blended such that the blended pozzolan is capable of remaining in a pumpable fluid state for greater than 5 days with minimal to no impact on the compressive strength of the pozzolan once it has set. As a further example, the ratio of one pozzolan to another may be about 10:90, 20:80, 30:70, 40:60, 50:50, 60:40, 70:30, 80:20, or about 90:10. One of ordinary skill in the art, with the benefit of this disclosure, should be able to blend two or more pozzolans to create a cement composition suitable for a chosen application.

Embodiments of the cement compositions may comprise lime. Further, the lime in some embodiments may comprise hydrated lime. As used herein, the term "hydrated lime" will be understood to mean calcium hydroxide. In some embodiments, the lime may be provided as quicklime (calcium oxide) which hydrates when mixed with water to form a hydrated lime. The lime may be included in embodiments of the cement compositions, for example, to form a hydraulic composition with the pozzolan. For example, the lime may be included in a pozzolan-to-lime weight ratio of about 10:1 to about 1:1 or a ratio of about 3:1 to about 5:1. Where present, the lime may be included in the cement compositions in an amount in the range of from about 10% to about 100% by weight of the pozzolan, for example. In some embodiments, the lime may be present in an amount ranging between any of and/or including any of about 10%, about 20%, about 40%, about 60%, about 80%, or about 100% by weight of the pozzolan. One of ordinary skill in the art, with the benefit of this disclosure, will recognize the appropriate amount of lime to include for a chosen application.

Embodiments of the cement compositions may comprise a set retarder. A broad variety of set retarders may be suitable for use in the cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the cement compositions in an amount sufficient to delay the setting for a desired time. In some embodiments, the set retarder may be present in the cement compositions in an amount in the range of from about 0.01% to about 10% by weight of the pozzolan. In specific embodiments, the set retarder may be present in an amount ranging between any of and/or including any of about 0.01%, about 0.1%, about 1%, about 2%, about 4%, about 6%, about 8%, or about 10% by weight of the pozzolan. One of ordinary skill in the art, with the benefit of this disclosure, will recognize the appropriate amount of the set retarder to include for a chosen application.

As previously mentioned, embodiments of the cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other optional components of the cement composition. For example, it is believed that the polycarboxylated ether dispersants may react with certain set retarders (e.g., phosphonic acid derivatives) resulting in formation of a gel that suspends the pozzolan and lime in the composition for an extended period of time.

In some embodiments, the dispersant may be included in the cement compositions in an amount in the range of from about 0.01% to about 5% by weight of the pozzolan. In specific embodiments, the dispersant may be present in an amount ranging between any of and/or including any of about 0.01%, about 0.1%, about 0.5%, about 1%, about 2%, about 3%, about 4%, or about 5% by weight of the pozzolan. One of ordinary skill in the art, with the benefit of this disclosure, will recognize the appropriate amount of the dispersant to include for a chosen application.

Some embodiments of the cement compositions may comprise silica sources in addition to the pozzolan; for example, crystalline silica and/or amorphous silica. Crystalline silica is a powder that may be included in embodiments of the cement compositions, for example, to prevent cement compressive strength retrogression. Amorphous silica is a powder that may be included in embodiments of the cement compositions as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. An example of a suitable source of amorphous silica is Silicalite™ cement additive available from Halliburton Energy Services, Inc., Houston, Tex. Embodiments comprising additional silica sources may utilize the additional silica source as needed to enhance compressive strength or set times.

Other additives suitable for use in cementing operations also may be included in embodiments of the cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the cement compositions after storing but prior to the placement of a cement composition. A person having ordinary skill in the art, with the benefit of this disclosure, should readily be able to determine the type and amount of additive useful for a particular application and desired result.

Those of ordinary skill in the art will appreciate that embodiments of the cement compositions generally should have a density suitable for a particular application. By way of example, the cement compositions may have a density in the range of from about 4 pounds per gallon ("lb/gal") to about 20 lb/gal. In certain embodiments, the cement compositions may have a density in the range of from about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. In embodiments, weighting additives may be used to increase the density of the cement compositions. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, will recognize the appropriate density for a particular application.

As previously mentioned, the cement compositions that have been retarded such that they comprise a set-delayed state may be capable of remaining in a pumpable fluid state for at least one day (e.g., at least about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. The compositions may be stored while remaining in a pumpable fluid state until required. Moreover, the compositions may be transported while remaining in a pumpable fluid state. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

As show below in the examples, a pozzolan (e.g., pumice) with a lower surface area may be used in some embodiments for preparation of a set-delayed cement composition. The lower surface area of the pozzolan may lessen the tendency of a more reactive pozzolan to gel or otherwise interact with other components of the cement composition. In particular embodiments, the pozzolan used in the set-delayed cement composition may have a surface of from about 2 $m^2/g$ to about 10 $m^2/g$ and, alternatively, from about 3 $m^2/g$ to about 7 $m^2/g$. A pozzolan having a higher surface area (e.g., >10 $m^2/g$) may be blended with the lower surface area pozzolan to provide increased activity in some embodiments. By way of example, a lower surface area pumice may be blended with a high surface area pumice.

When desired for use, the retarded and/or set-delayed cement composition embodiments may be activated (e.g., by combination with an activator or by thermal activation) to set into a hardened mass. The term "cement set activator" or "activator", as used herein, refers to an additive that activates a set-delayed and/or retarded cement composition and may also accelerate the setting of the set-delayed and/or retarded cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

Embodiments may include the addition of a cement set activator to retarded and/or set-delayed cement composition embodiments. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the retarded and/or set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the retarded and/or set-delayed cement composition as a liquid additive, for example, a liquid additive comprising a monovalent salt, a polyphosphate, and optionally a dispersant.

The cement set activator should be added to embodiments of the retarded and/or set-delayed cement compositions in an amount sufficient to induce the set-delayed composition to set into a hardened mass. In certain embodiments, the cement set activator may be added to the retarded and/or set-delayed cement composition in an amount in the range of about 0.1% to about 20% by weight of the pozzolan. In specific embodiments, the cement set activator may be present in an amount ranging between any of and/or including any of about 0.1%, about 1%, about 5%, about 10%, about 15%, or about 20% by weight of the pozzolan. One of ordinary skill in the art, with the benefit of this disclosure, will recognize the appropriate amount of the cement set activator to include for a chosen application.

In embodiments, the cement compositions may set to have a desirable compressive strength after activation. Compressive strength is generally the capacity of a material or structure to withstand axially directed pushing forces. The compressive strength may be measured at a specified time when the composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the cement compositions may develop a 24-hour compressive strength in the range of from about 50 psi to about 5000 psi, alternatively, from about 100 psi to about 4500 psi, or alternatively from about 500 psi to about 4000 psi. In some embodiments, the cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the cement compositions may have desirable thickening times. Thickening time typically refers to the time a fluid, such as a cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

As will be appreciated by those of ordinary skill in the art, embodiments of the cement compositions may be used in a variety of cementing operations, including primary and remedial cementing. In some embodiments, a cement composition may be provided that comprises water, a pozzolan, and hydrated lime. The cement composition may be introduced into a subterranean formation and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, or into both.

In some embodiments, a set-delayed cement composition may be provided that comprises water, a pozzolan, lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, an embodiment of a cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore.

In remedial cementing embodiments, a cement composition may be used, for example, in squeeze-cementing operations or in the placement of cement plugs. By way of example, the composition may be placed in a wellbore to plug an opening (e.g., a void or crack) in the formation, in a gravel pack, in the conduit, in the cement sheath, and/or between the cement sheath and the conduit (e.g., a microannulus).

An embodiment discloses a method of formulating a cement composition. The method may comprise measuring surface area of a group of pozzolans, wherein the smallest measured surface area of the group of pozzolans and the largest measured surface area of the group of pozzolans vary by about 50% or greater. The method may further comprise selecting one or more pozzolans from the group of pozzolans. The method may further comprise adding components comprising lime and water to the selected one or more pozzolans to form a cement composition.

An embodiment discloses a method of cementing in a subterranean formation. The method may comprise providing a first pozzolan. The method may further comprise providing a second pozzolan, wherein the second pozzolan comprises pozzolan particles having a surface area that varies by about 50% or more from pozzolan particles of the first pozzolan. The method may further comprise blending the first pozzolan and the second pozzolan to form a blended pozzolan. The method may further comprise adding components lime and water to the blended pozzolan to form a cement composition. The method may further comprise introducing the cement composition into the subterranean formation. The method may further comprise allowing the cement composition to set in the subterranean formation.

Referring now to FIG. 1, preparation of a cement composition (which may be set delayed or non-set delayed) in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole.

Figure 2:
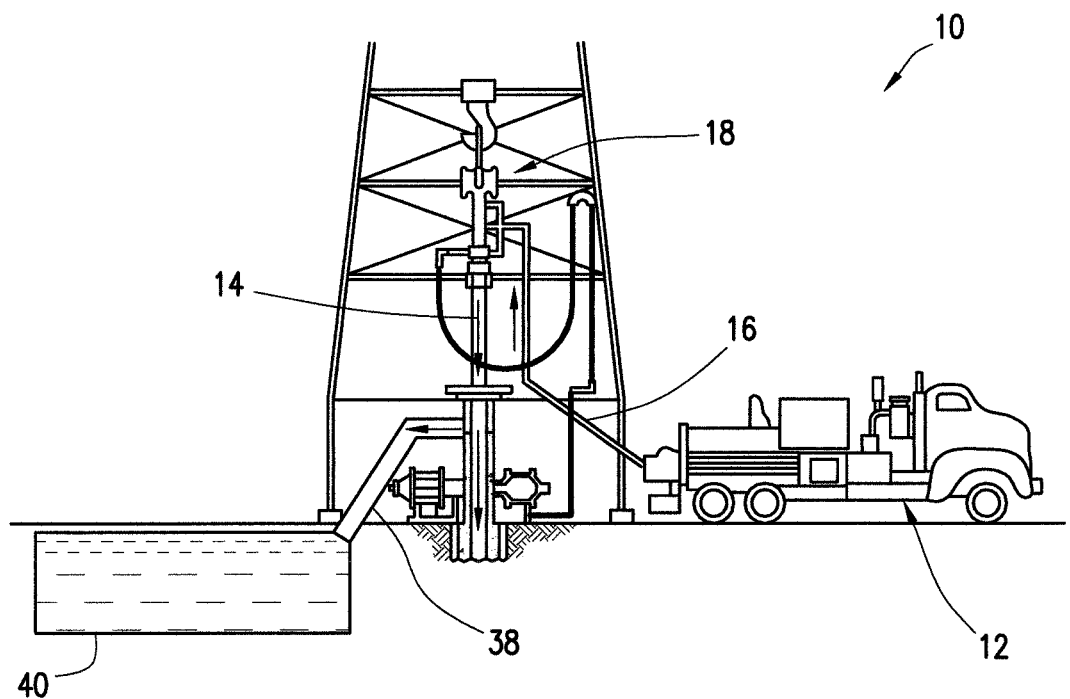
FIG. 2 illustrates surface equipment that may be used in placement of a cement composition in a wellbore in accordance with certain embodiments.

An example technique for placing a cement composition into a subterranean formation will now be described with reference to FIGS. 2 and 3. FIG. 2 illustrates surface equipment 10 that may be used in placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 3:
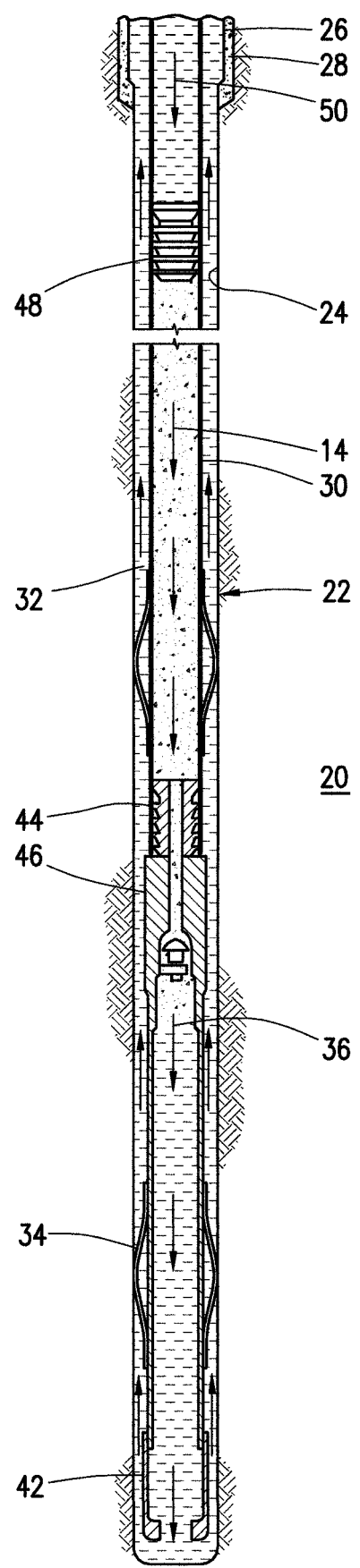
FIG. 3 illustrates placement of a cement composition into a wellbore annulus in accordance with certain embodiments.

Turning now to FIG. 3, the set-delayed or non-set-delayed pozzolanic cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the pozzolanic cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the pozzolanic cement composition 14 through the bottom plug 44. In FIG. 3, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the embodiments, the following examples of certain aspects of some embodiments are given. In no way should the following examples be read to limit, or define, the entire scope of the disclosure.

EXAMPLES

Example 1

Four pumice samples were obtained, with each sample having similar particle sizes but a different surface area. The pumice samples were DS-325 grade, available from Hess Pumice Products, Inc., Malad, Id. DS-325 grade is a −325 mesh lightweight aggregate pumice, according to the mesh measurements the DS-325 grade Pumice should typically have a d50 particle size distribution of about 12-17 microns. The details of the sample properties are described below in Table 1.

TABLE 1

Pumice Sample Analysis

| Sample | Pumice Grade | Density (g/mL) | Surface Area (m²/g) | $D_{50}$ (μm) |
|---|---|---|---|---|
| 1 | DS-325 | 2.28 | 4.09 | 14.0 |
| 2 | DS-325 | 2.30 | 10.28 | 15.4 |
| 3 | DS-325 | 2.46 | 5.90 | 14.2 |
| 4 | DS-325 | 2.51 | 17.90 | 12.3 |

Measurement of the particle sizes show that the mesh estimation approximates the experimentally determined particle sizes. The particles size was measured using a Malvern Mastersizer 3000 available from Malvern Instruments, Worcestershire, United Kingdom. Pumice Samples 3 and 4 were used to create two cement composition slurries, Experimental Sample 1 and Experimental Sample 2 respectively as illustrated in Table 2 below.

TABLE 2

Experimental Sample Description

| Experimental Sample | Pumice Grade | Density (g/mL) | Surface Area (m²/g) | $D_{50}$ (μm) |
|---|---|---|---|---|
| 1 | DS-325 | 2.46 | 5.90 | 14.2 |
| 2 | DS-325 | 2.51 | 17.90 | 12.3 |

With the exception of a suspending agent added to Experimental Sample 1 to aid particle suspension, the cement composition slurries were prepared in the exact same way so that the only major difference between the two samples was the surface area of the pumice. The composition of the experimental samples is presented in Table 3 below.

TABLE 3

Experimental Sample Compositional Makeup

| Component | Amount (% bwoP)* |
|---|---|
| Water | 60.0 |
| Pumice | 100.0 |
| Hydrated Lime | 20.0 |
| Dispersant | 0.60 |
| Retarder | 1.25 |
| Co-Retarder | 0.50 |
| Weighting Agent | 2.0 |
| Suspending Agent** | 0.035 |

*% by weight of Pumice;
**only used in Experimental Sample 1

The compositions had a density of 13.5 pounds per gallon. The dispersant was Liquiment® 5581F dispersant available from BASF, Florham Park, N.J. The cement retarder was Micro Matrix® Cement Retarder available from Halliburton Energy Services, Inc., Houston, Tex. The cement co-retarder was HR®-5 Cement Retarder available from Halliburton Energy Services, Inc., Houston, Tex. The weighting agent was Micromax® FF weight additive available from Halliburton Energy Services, Inc., Houston, Tex. The suspending agent was SA-1015™ suspending agent available from Halliburton Energy Services, Inc., Houston, Tex.

After preparation, the shelf lives of Experimental Sample 1 and Experimental Sample 2 were measured by placing a portion of each sample into a sealed container and leaving them at ambient temperature and pressure conditions. The samples were checked daily to measure and to observe changes. Experimental Sample 2 gelled and became overly viscous at 12 days and required additional dispersant in order to reduce the viscosity. Experimental Sample 1 maintained a pumpable fluid state for greater than 40 days.

Next, the rheological properties of the experimental samples were measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The volume average viscosities (VAV) were calculated using the torque dial readings and the calibrated factors that convert RPM to shear rate and dial readings to shear stress. Table 4 tabulates the apparent viscosity of the composition at 100 rpm versus the composition age.

TABLE 4

Volume Average Viscosity at 100 RPM (Centipoise)

| Age | Experimental Sample 1 | Experimental Sample 2 |
|---|---|---|
| Day 0 | 351 | 975 |
| Day 3 | 273 | 1566 |
| Day 11 | 234 | 2795 |
| Day 12 | — | >3000 |
| Day 21 | 247 | —* |
| Day 30 | 273 | — |
| Day 42 | 429 | — |

*— means that the viscosity was not measured for that day.

As is shown by the data, the high surface area slurry (Experimental Sample 2) exhibited a consistently higher volume average viscosity than that of the lower surface area slurry. Over 11 days the $VAV_{100\ rpm}$ of Experimental Sample 2 averaged 1779 cP, whereas the $VAV_{100\ rpm}$ of Experimental Sample 1 averaged only 286 cP.

Lastly, both experimental samples were activated. Each experimental sample was split into two portions and an activator added to each. One activator was a 2% active liquid additive combination of sodium hexametaphosphate (SHMP) and sodium sulfate, the other activator was a 10% active calcium chloride. After activation, the samples were poured into 2" by 4" brass cylinders and cured for 24 hours at 140° F. in a waterbath. After the samples were cured, the destructive compressive strength was measured by using a mechanical press to crush the samples in accordance with the procedure set forth in API RP Practice 10B-2, *Recommended Practice for Testing Well Cements*. The results are presented in Table 5 below.

TABLE 5

Compressive Strength Measurements

| Experimental Sample | Pumice Surface Area ($m^2/g$) | Activator | Compressive Strength (psi) |
|---|---|---|---|
| 1 | 5.90 | 2% SHMP/$Na_2SO_4$ | 551 |
| 2 | 17.90 | 2% SHMP/$Na_2SO_4$ | 934 |
| 1 | 5.90 | 10% $CaCl_2$ | 0 |
| 2 | 17.90 | 10% $CaCl_2$ | 390 |

These results are an average of three experiments. The results indicate that pumice particles with a higher surface area are more reactive than pumice particles with lower surface areas. Experimental Sample 2 therefore had a higher compressive strength than Experimental Sample 1. However, Experimental Sample 2 also exhibited a faster gelation and a higher viscosity than Experimental Sample 1 which may have negative implications in set-delayed embodiments or in any embodiment requiring the cement composition to remain in a pumpable fluid state for an extended period.

Example 2

Experimental Samples 3 and 4 were prepared to create two cement composition slurries. Experimental Sample 3 and Experimental Sample 4 utilized Pumice comprising not just different surface areas, but different particles sizes as well in order to demonstrate the contribution particle size may have with respect to cement properties. The characteristics of the samples are illustrated in Table 6 below.

TABLE 6

Experimental Sample Description

| Experimental Sample | Pumice Grade | Density (g/mL) | Surface Area ($m^2/g$) | $D_{50}$ (μm) |
|---|---|---|---|---|
| 3 | DS-200 | 2.39 | 4.32 | 23.0 |
| 4 | DS-325 | 2.51 | 17.90 | 12.3 |

The cement composition slurries were prepared in the exact same way so that the only major difference between the two samples was the surface area and the particle size of the pumice. The composition of the experimental samples is presented in Table 7 below.

TABLE 7

Experimental Sample Compositional Makeup

| Component | Amount (% bwoP)* |
|---|---|
| Water | 60.0 |
| Pumice | 100.0 |
| Hydrated Lime | 20.0 |
| Dispersant | 0.60 |
| Retarder | 1.25 |
| Co-Retarder | 0.50 |
| Weighting Agent | 2.0 |

*% by weight of Pumice

The compositions had a density of 13.5 pounds per gallon. The dispersant was Liquiment® 5581F dispersant available from BASF, Florham Park, N.J. The cement retarder was Micro Matrix® Cement Retarder available from Halliburton Energy Services, Inc., Houston, Tex. The cement co-retarder was HR®-5 Cement Retarder available from Halliburton Energy Services, Inc., Houston, Tex. The weighting agent was Micromax® FF weight additive available from Halliburton Energy Services, Inc., Houston, Tex.

After preparation, the shelf lives of Experimental Sample 3 and Experimental Sample 4 were measured by placing a portion of each sample into a sealed container and leaving them at ambient temperature and pressure conditions. The samples were checked daily to measure to observe changes. Experimental Sample 4 gelled and became overly viscous at 10 days and required additional dispersant in order to reduce the viscosity. Experimental Sample 3 maintained a pumpable fluid state for greater than 17 days.

Next, the rheological properties of the experimental samples were measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The volume average viscosities (VAV) were calculated using the torque dial readings and the calibrated factors that convert RPM to shear rate and dial readings to shear stress. Table 8 tabulates the apparent viscosity of the composition at 100 rpm versus the composition age.

TABLE 8

Volume Average Viscosity at 100 RPM (Centipoise)

| Age | Experimental Sample 3 | Experimental Sample 4 |
|---|---|---|
| Day 0 | 364 | 975 |
| Day 5 | 568 | 1859 |

TABLE 8-continued

Volume Average Viscosity at 100 RPM (Centipoise)

| Age | Experimental Sample 3 | Experimental Sample 4 |
|---|---|---|
| Day 11 | 546 | 2795 |
| Day 18 | 754 | —* |

*— means that the viscosity was not measured for that day.

As is shown by the data, the low surface area—large particle size slurry (Experimental Sample 3) exhibited a consistently lower volume average viscosity than that of the high surface area—small particle size slurry. Over 11 days the $VAV_{100\ rpm}$ of Experimental Sample 3 averaged 493 cP, whereas the $VAV_{100\ rpm}$ of Experimental Sample 4 averaged 1876 cP.

Lastly, both experimental samples were activated. Each experimental sample was split into two portions and an activator added to each. One activator was a 2% active liquid additive combination of sodium hexametaphosphate (SHMP) and sodium sulfate, the other activator was a 10% active calcium chloride. After activation, the samples were poured into 2" by 4" brass cylinders and cured for 24 hours at 140° F. in a water bath. After the samples were cured, the destructive compressive strength was measured by using a mechanical press to crush the samples in accordance with the procedure set forth in API RP Practice 10B-2, *Recommended Practice for Testing Well Cements*. The results are presented in Table 9 below.

TABLE 9

Compressive Strength Measurements

| Experimental Sample | Particle Size $D_{50}$ (μm) | Pumice Surface Area (m²/g) | Activator | Compressive Strength (psi) |
|---|---|---|---|---|
| 3 | 23.0 | 4.32 | 2% SHMP/Na₂SO₄ | 193 |
| 4 | 12.3 | 17.90 | 2% SHMP/Na₂SO₄ | 934 |
| 3 | 23.0 | 4.32 | 10% CaCl₂ | ~50 |
| 4 | 12.3 | 17.90 | 10% CaCl₂ | 390 |

These results are an average of three experiments. The results indicate that pumice particles with a smaller particle sizes and higher surface areas are more reactive than pumice particles with larger particle sizes and lower surface areas. Experimental Sample 4 therefore had a higher compressive strength than Experimental Sample 3. However, Experimental Sample 4 also exhibited a faster gelation and a higher viscosity than Experimental Sample 3 which may have negative implications in set-delayed embodiments or in any embodiment requiring the cement composition to remain in a pumpable fluid state for an extended period.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and they may be modified and practiced in different but equivalent manners apparent to those skilled in the art having the benefit of the teachings herein. Although individual embodiments are discussed, all combinations of all those embodiments are covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of formulating a cement composition:
   measuring surface area of a group of pozzolans, wherein a smallest measured surface area of the group of pozzolans and a largest measured surface area of the group of pozzolans vary by about 50% or greater;
   selecting one or more pozzolans from the group of pozzolans; and
   adding components comprising lime and water to the selected one or more pozzolans to form a cement composition, wherein cementitious components present in the cement composition comprise the selected one or more pozzolans without any additional cementitious components other than pozzolans that hydraulically set in the presence of the water.

2. The method according to claim 1 wherein the group of pozzolans are selected from the group consisting of: fly ash, silica fume, metakaolin, pumice, and any combination thereof.

3. The method according to claim 1 wherein the cement composition further comprises a set retarder, wherein the set retarder comprises at least one retarder selected from the group consisting of a phosphonic acid, a phosphonic acid derivative, a lignosulfonate, a salt, an organic acid, a cellulose derivate, a synthetic co- or ter-polymer comprising sulfonate and carboxylic acid groups, a borate compound, and any combination thereof.

4. The method according to claim 1 wherein the cement composition further comprises at least one dispersant selected from the group consisting of a sulfonated-formaldehyde-based dispersant, a polycarboxylated ether dispersant, and a combination thereof.

5. The method according to claim 1 wherein the cement composition further comprises a cement set activator selected from the group consisting of calcium chloride, triethanolamine, sodium silicate, zinc formate, calcium acetate, sodium hydroxide, sodium sulfate, nanosilica, sodium hexametaphosphate, and any combinations thereof.

6. The method according to claim 1 wherein the selected one or more pozzolans comprise pozzolan particles having a surface area of from about 1 $m^2/g$ to about 20 $m^2/g$.

7. The method according to claim 1 further comprising measuring a particle size distribution of the group of pozzolans, wherein the group of pozzolans has a d50 particle size distribution in a range of from about 10 microns to about 25 microns.

8. The method according to claim 1 wherein the cement composition is a set-delayed cement composition having a thickening time at room temperature of about 7 days or longer.

9. The method according to claim 1 wherein the selected one or more pozzolans comprises pumice having a surface area of from about 3 $m^2/g$ to about 7 $m^2/g$.

10. The method according to claim 1 wherein the group of pozzolans comprises a first pumice and a second pumice, wherein particle sizes of the first pumice and the second pumice varies by about 10% or less while the surface areas of the first pumice and the second pumice varies by about 50% or more.

11. A method of formulating a cement composition:
measuring surface area of a group of pozzolans, wherein a smallest measured surface area of the group of pozzolans and a largest measured surface area of the group of pozzolans vary by about 50% or greater;
selecting a first pozzolan from the group of pozzolans;
selecting a second pozzolan from the group of pozzolans, wherein the second pozzolan comprises pozzolan particles having a surface area that varies by about 50% or more from pozzolan particles of the first pozzolan; and
adding components comprising lime and water to the selected one or more pozzolans to form a cement composition, wherein cementitious components present in the cement composition comprise pozzolans comprising the first pozzolan and the second pozzolan without any additional cementitious components other than the pozzolans that hydraulically set in the presence of the water.

* * * * *